(12) United States Patent
Linares

(10) Patent No.: US 10,523,074 B2
(45) Date of Patent: Dec. 31, 2019

(54) ELECTRICAL ENERGY CONVERSION SYSTEM IN THE FORM OF AN INDUCTION MOTOR OR GENERATOR WITH VARIABLE COIL WINDING PATTERNS EXHIBITING MULTIPLE AND DIFFERENTLY GAUGED WIRES ACCORDING TO VARYING BRAID PATTERNS

(71) Applicant: MAESTRA ENERGY, LLC, Auburn Hills, MI (US)

(72) Inventor: Miguel A. Linares, Bloomfield Hills, MI (US)

(73) Assignee: MAESTRA ENERGY, LLC, Auburn Hills, MI (US)

( * ) Notice: Subject to any disclaimer, the term of this patent is extended or adjusted under 35 U.S.C. 154(b) by 50 days.

(21) Appl. No.: 15/912,691

(22) Filed: Mar. 6, 2018

(65) Prior Publication Data

US 2018/0205279 A1    Jul. 19, 2018

Related U.S. Application Data

(63) Continuation-in-part of application No. 14/598,715, filed on Jan. 16, 2015, now abandoned.
(Continued)

(51) Int. Cl.
*H02K 3/28* (2006.01)
*H02K 1/27* (2006.01)
(Continued)

(52) U.S. Cl.
CPC ............. *H02K 3/28* (2013.01); *H02K 1/2786* (2013.01); *H02K 3/32* (2013.01); *H02K 3/47* (2013.01)

(58) Field of Classification Search
CPC .. H02K 3/00; H02K 3/02; H02K 3/04; H02K 3/12; H02K 3/14; H02K 3/18; H02K 3/28;
(Continued)

(56) References Cited

U.S. PATENT DOCUMENTS

| 587,764 | A |   | 8/1897 | Short |   |
|---|---|---|---|---|---|
| 1,000,440 | A | * | 8/1911 | Reeves | ................. H01F 27/323 336/186 |

(Continued)

FOREIGN PATENT DOCUMENTS

| CN | 1734685 | * 10/2004 | ............. H01F 27/28 |
|---|---|---|---|
| FR | 2995743 A1 | 3/2014 | |

(Continued)

OTHER PUBLICATIONS

English Machine Translation, WO 2015155934 A1, Ogawa (Year: 2015).*

*Primary Examiner* — Burton S Mullins
(74) *Attorney, Agent, or Firm* — Douglas J. McEvoy

(57) ABSTRACT

An induction motor assembly for converting an electrical input to a mechanical or rotating work output. A related generator variant converts a rotating work input to a converted electrical output utilizing the same efficiencies achieved by the present design. An outer rotatable component incorporates a plurality of magnets arranged in a circumferentially extending and inwardly facing fashion according to a first perimeter array, the outer component further incorporating a rotating shaft projecting from a central location. An inner concentrically arrayed and stationary component exhibits a plurality of coil sub-assemblies, each including a multi-wire and multiple winding braided configuration. The coil sub-assemblies are supported in an exteriorly facing fashion upon the inner stationary component according to a second perimeter array, (Continued)

such that a determined gap separates coil sub-assemblies from the inwardly facing magnets. A three phase current introduced typically to the outer stationary coils rotating the outer magnetic component with central projecting shaft.

4 Claims, 7 Drawing Sheets

Related U.S. Application Data

(60) Provisional application No. 61/928,253, filed on Jan. 16, 2014.

(51) Int. Cl.
*H02K 3/47* (2006.01)
*H02K 3/32* (2006.01)

(58) Field of Classification Search
CPC ........ H02K 1/2786; H02K 21/16; H01R 4/02; H01R 4/021; H01R 4/023; H01R 4/029; H01R 4/62; H01R 4/625
USPC .......... 310/181, 184, 208, 216, 74, 216.091; 336/186–187
See application file for complete search history.

(56) References Cited

U.S. PATENT DOCUMENTS

| | | | |
|---|---|---|---|
| 1,846,907 A * | 2/1932 | Schermerhorn | H02K 13/04 310/208 |
| 4,182,967 A | 1/1980 | Jordan | |
| 4,412,170 A | 10/1983 | Roesel, Jr. | |
| 4,456,858 A | 6/1984 | Loven | |
| 4,491,769 A | 1/1985 | Heidelberg | |
| 4,663,536 A | 5/1987 | Roesel, Jr. et al. | |
| 5,635,781 A * | 6/1997 | Moritan | H02K 3/18 310/216.005 |
| 5,796,195 A | 8/1998 | Miyakawa | |
| 6,034,460 A | 3/2000 | Tajima et al. | |
| 6,049,152 A | 4/2000 | Nakano | |
| 6,528,918 B2 | 3/2003 | Paulneues et al. | |
| 6,570,288 B1 * | 5/2003 | Kaizuka | H02K 1/2786 310/156.01 |
| 6,674,011 B2 | 1/2004 | Ueno et al. | |
| 6,741,007 B2 | 5/2004 | Frash et al. | |
| 7,126,234 B2 | 10/2006 | Fan | |
| 7,605,514 B2 * | 10/2009 | Ito | H02K 3/28 310/179 |
| 7,772,737 B1 * | 8/2010 | Fakonas | H02K 17/08 310/180 |
| 7,777,133 B2 * | 8/2010 | Onuma | H01R 4/20 174/84 C |
| 7,843,102 B1 | 11/2010 | Wyremba | |
| 7,928,624 B2 | 4/2011 | Huppunen et al. | |
| 7,965,011 B2 | 6/2011 | Liao | |
| 8,106,558 B2 | 1/2012 | Yamamoto | |
| 8,134,270 B2 * | 3/2012 | Nishiyama | H02K 3/28 310/156.45 |
| 8,183,802 B2 | 5/2012 | Quere | |
| 8,247,943 B2 | 8/2012 | Prucher | |
| 8,264,114 B2 * | 9/2012 | Taniguchi | H02K 3/28 310/180 |
| 8,344,572 B2 | 1/2013 | Moellgaard et al. | |
| 8,482,179 B2 | 7/2013 | Nakamura et al. | |
| 8,541,921 B2 | 9/2013 | Jang et al. | |
| 8,552,609 B2 | 10/2013 | Nishiyama | |
| 8,936,187 B2 * | 1/2015 | Hino | H01R 43/02 228/112.1 |
| 9,973,051 B2 * | 5/2018 | Ogawa | H01R 4/184 |
| 2004/0027016 A1 | 2/2004 | Bruder et al. | |
| 2004/0256941 A1 | 12/2004 | Yoneda et al. | |
| 2005/0017591 A1 | 1/2005 | Brewster et al. | |
| 2006/0103252 A1 | 5/2006 | Yokota | |
| 2006/0197398 A1 * | 9/2006 | Maynez | H02K 3/12 310/198 |
| 2007/0096580 A1 | 5/2007 | Ketteler | |
| 2008/0174195 A1 | 7/2008 | Tupper et al. | |
| 2008/0296992 A1 | 12/2008 | Militzer | |
| 2009/0021098 A1 | 1/2009 | Takeuchi | |
| 2009/0289512 A1 | 11/2009 | Prucher | |
| 2009/0295531 A1 | 12/2009 | Silva | |
| 2010/0013335 A1 | 1/2010 | Strube | |
| 2010/0060097 A1 | 3/2010 | Peterson | |
| 2010/0244611 A1 | 9/2010 | Akutsu et al. | |
| 2011/0057534 A1 | 3/2011 | Goda | |
| 2012/0161566 A1 | 6/2012 | Ikuta et al. | |
| 2012/0235528 A1 | 9/2012 | Axford | |
| 2013/0127287 A1 | 5/2013 | Stephenson | |
| 2013/0214541 A1 | 8/2013 | Kamper et al. | |
| 2013/0214632 A1 | 8/2013 | Muniz Casais et al. | |
| 2014/0197709 A1 | 7/2014 | Hasegawa | |
| 2014/0375164 A1 | 12/2014 | Deak et al. | |
| 2017/0040860 A1 * | 2/2017 | Schogler | H02K 3/04 |

FOREIGN PATENT DOCUMENTS

| | | | |
|---|---|---|---|
| GB | 191513481 A | 9/1916 | |
| GB | 501432 A | 2/1939 | |
| GB | 762078 A | 11/1956 | |
| JP | 54-149803 | * 11/1979 | H02K 3/38 |
| JP | 3057913 U | 6/1999 | |
| JP | 2007529988 A | 10/2007 | |
| JP | 2012515520 A | 7/2012 | |
| JP | 5550829 B2 | 7/2014 | |
| WO | 0118940 A2 | 3/2001 | |
| WO | 2012017302 A1 | 2/2012 | |
| WO | WO 2015155934 A1 * | 10/2015 | H02K 3/02 |

\* cited by examiner

ELECTRICAL ENERGY CONVERSION SYSTEM IN THE FORM OF AN INDUCTION MOTOR OR GENERATOR WITH VARIABLE COIL WINDING PATTERNS EXHIBITING MULTIPLE AND DIFFERENTLY GAUGED WIRES ACCORDING TO VARYING BRAID PATTERNS

CROSS-REFERENCE TO RELATED APPLICATIONS

This Application claims the benefit of U.S. Ser. No. 14/598,715 filed Jan. 16, 2015. The '715 application in turn claims the priority of U.S. Provisional Application 61/928,253 filed on Jan. 16, 2014, the contents of which is incorporated herein in its entirety.

FIELD OF THE INVENTION

The present invention relates generally to an electrical motor and, more specifically, a style of AC induction motor assembly for converting an electrical input to a mechanical or rotating work output. A related generator variant converts a rotating work input to a converted electrical output utilizing the same efficiencies achieved by the present design. The present invention further teaches variations of braided and layered electromagnetic coil windings in which the winding patterns can be varied in order to increase the electrical output capabilities beyond that of known coil subassemblies.

BACKGROUND OF THE INVENTION

In electricity generation, an electric generator is a device that converts mechanical energy to electrical energy. A generator forces electric current to flow through an external circuit. As is further known, the source of mechanical energy may be a reciprocating or turbine steam engine, water falling through a turbine or waterwheel, an internal combustion engine, a wind turbine, a hand crank, compressed air, or any other source of mechanical energy. In practical applications, generators provide nearly all of the power for electric power grids.

As is further known, the reverse conversion of electrical energy into mechanical energy is done by an electric motor, and motors and generators have many similarities. Many motors can be mechanically driven to generate electricity and frequently make acceptable generators.

Electrical generators and motors (such as of the AC induction or DC variety) typically include an outer stator (or stationary component) which is usually shaped as a hollow cylinder containing copper wires which are wound or otherwise configured within the inner facing wall. In a motor configured application, electricity flowing into selected pairs of coils configured within the stator (a three phase motor typically includes three individual pairs of coils which are arranged in opposing and partially circumferentially offsetting fashion) results in rotation of an interiorly positioned rotor component.

The rotor is usually shaped as a solid cylinder that sits inside the stator (with a defined air gap between the outer cylindrical surface of the rotor and the inner cylindrical surface of the stator) with an output shaft extending from an axial centerline of the rotor. The rotor further includes a series of highly conductive elements (such as aluminum rods) embedded within its outer surface.

In an electric motor driving application, a separate current is fed to the rods via a commutator which is a mechanism used to switch the input of certain AC and DC machines and which usually includes a plurality of slip ring segments insulated from each other and from the rotor shaft. An armature current is supplied through a plurality of stationary brushes which are arranged in contact with the rotor supported and revolving commutator, this causing a required current reversal for applying power to the motor in an optimal manner as the rotator rotates from pole to pole (it being noted that the absence of such current reversal would result in the motor braking to a stop).

The stator simulates motion by switching applied current in an overlapping fashion (via the partially overlapping and circumferentially offset sets of coils integrated into the stator inner cylindrical wall). As is further known, the magnetic force created in the stator by energizing the wires or coils is opposed by the armature current supplied rods embedded within the rotor, such that the force of the magnetic field generated in the stator in the multi-phase (staged) fashion results in the driving the current in the rotor supported rods (and therefore the rods and rotor as well) at a right angle to the magnetic field induced, thereby rotating the magnetically suspended (air gap supported) rotor and output shaft at a desired speed without the necessity of any moving components.

In this fashion, magnetic fields are formed in both the rotor and the stator, with the product of these giving rise to the force generated driving torque applied to the (typically inner concentrically supported) rotor. As is further understood, one or both of these magnetic fields (as explained further by Faraday's Law and associated Lorentz Forces Law) must be made to change with the rotation of the motor, such as accomplished by switching the poles on and off at the correct time intervals or by varying the strengths of the poles.

Additional variations of more recent AC electric motors further include either synchronous or asynchronous motors (this again being based upon the speed of rotation of the magnetically generated field under Faraday's Law). In particular, a synchronous electric motor is an AC motor distinguished by a rotor spinning with coils passing magnets at the same rate as the AC and resulting magnetic field which drives it (i.e. exhibiting zero slip under typical operating conditions). In contrast, induction style motors must slip to produce torque and which operate under the principle of inducting electricity into the rotor by magnetic induction (as opposed to by direct electrical connection).

Additional known features include a commutator which is defined as a mechanism used to switch the input of certain AC and DC machines and consisting of slip ring segments insulated from each other and from the electric motor's shaft. In this application, the motor's armature current is supplied through an arrangement of stationary brushes in contact with the (typically) revolving commutator, which causes the required current reversal and applies power to the machine in an optimal manner as the rotor rotates from pole to pole.

Building upon the above explanation, and in an alternate generator application, the rotary shaft is again the input of the rotation by means of an outside work source and, upon being rotated, the configuration of the above-described coils passes by the magnets to create an electrical charge (or field) that becomes the output power variable. An induction generator or asynchronous generator is a type of AC electrical generator that uses the principles of induction motors to produce power.

Induction generators operate by mechanically turning their rotor faster than the synchronous speed, giving negative slip. A regular AC asynchronous motor usually can be used as a generator, without any internal modifications. Induction generators are useful in applications such as mini-hydro power plants, wind turbines, or in reducing high-pressure gas streams to lower pressure, because they can recover energy with relatively simple controls. To operate an induction generator must be excited with a leading voltage; this is usually done by connection to an electrical grid, or sometimes they are self-excited by using phase correcting capacitors.

Other known generator applications include a dynamo which is an electrical generator that produces direct current with the use of a commutator. Dynamos were the first electrical generators capable of delivering power for industry, and the foundation upon which many other later electric-power conversion devices were based, including the electric motor, the alternating-current alternator, and the rotary converter.

Without a commutator, a dynamo becomes an alternator, which is a synchronous singly fed generator. Alternators produce alternating current with a frequency that is based on the rotational speed of the rotor and the number of magnetic poles.

Automotive alternators produce a varying frequency that changes with engine speed, which is then converted by a rectifier to DC. By comparison, alternators used to feed an electric power grid are generally operated at a speed very close to a specific frequency, for the benefit of AC devices that regulate their speed and performance based on grid frequency. When attached to a larger electric grid with other alternators, an alternator will dynamically interact with the frequency already present on the grid, and operate at a speed that matches the grid frequency.

Typical alternators use a rotating field winding excited with direct current, and a stationary (stator) winding that produces alternating current. Since the rotor field only requires a tiny fraction of the power generated by the machine, the brushes for the field contact can be relatively small. In the case of a brushless exciter, no brushes are used at all and the rotor shaft carries rectifiers to excite the main field winding.

Applications of electro-magnetic motor and generator assemblies in the patent art include the permanent magnet motor generator set of Strube, US 2010/0013335, which teaches a method of utilizing unbalanced non-equilibrium magnetic fields to induce a rotational motion in a rotor, the rotor moves with respect to the armature and stator. A three tier device (armature, rotor, and stator) has the armature and stator being fixed in position with the rotor allowed to move freely between the armature and stator.

To induce a rotational motion, the rotor, in its concave side uses unbalanced non-equilibrium magnetic fields created by having multiple magnets held in a fixed position by ferritic or like materials to act upon the magnets imbedded in the armature. The rotor, in its convex side has additional unbalanced non-equilibrium magnets and additional pole pair magnets to create a magnetic flux that moves with the moving fixed position fields to cut across closely bonded coils of wire in the stator to induce a voltage and current that is used to generate electrical power. Multiple permanent magnets of varying strength are geometrically positioned in multiple groups to produce a motive power in a single direction with the remainder of the unbalanced magnetic flux positioned and being used to cut across the coils of wire to produce continuous electric power.

Hasegawa, US 2014/0197709, teaches an assembly conducting wire for a rotary electric machine winding which includes a plurality of bundled wires, these being twisted in a circumferential direction, with the wires being welded together at a predetermined distance. US 2007/0096580, to Ketteler, teaches a stator for a three phase current electric machine such as for motor vehicles and which consists of a winding support having grooves and teeth. The windings are arranged in the grooves and the winding support consists of a plurality of identical segments which, after being wound, are shaped into a circular ring. The segments are then inserted into a cylindrical housing and, with their windings, form the cylindrical stator.

Liao, U.S. Pat. No. 7,965,011, teaches a brushless DC motor structure with a constant ratio of multiple rotor poles to slots of the stator and which is characterized primarily by forming the stator of the motor by multiple ferromagnetic silicon steel sheets, where the ferromagnetic silicon steel sheets are provided with the multiple slots whose number is a multiple of 15, and the stator of the motor is formed by windings of the three phases, X, Y, and Z. Each phase includes 2 to 4 phase portions and each group has 5 slots. The rotor of the motor is made up of a plurality of arced magnets which are fixed orderly and equally along a ferromagnetic steel ring, and the radial direction of each arced magnet is opposite to that of the adjacent magnetic poles. An arced magnet represents a magnetic pole, and the number of the magnetic poles is a multiple of 14 or 16, such as for reducing the cogging torque of the motor.

WO 2012/017302, to Kamper/Stellenbosch University, teaches an electrical energy conversion system which is particularly suited for use in wind energy conversion systems. A pair of magnetically separated permanent magnet machines are linked by a freely rotating rotor housing permanent magnets. The first machine is typically a synchronous generator, and the second an induction generator. The synchronous generator has a stationary stator which is connectable to an electrical system such as an electricity grid, and the induction generator has a rotor which is connectable to a mechanical drive system such as a wind turbine.

Kamper, US 2013/0214541, teaches an electrical energy conversion system which is particularly suited for use in wind energy conversion systems. The system includes two magnetically separated permanent magnet machines linked by a freely rotating rotor housing permanent magnets. The first machine is typically a synchronous generator, and the second an induction generator. The synchronous generator has a stationary stator which is connectable to an electrical system such as an electricity grid, and the induction generator has a rotor which is connectable to a mechanical drive system such as, for example, a wind turbine.

Prucher, U.S. Pat. No. 8,247,943 teaches a radial gap motor/generator having a thin annular array of magnets mounted for rotation to a stator in a radially spaced relation to at least one thin annular induction structure fixed to a stationary stator may be air or liquid cooled. The motor has at least radial gap between a magnetic core and the array and may include multiple gaps and multiple annular induction structures to increase the overall power density of the system.

Additional references the outer rotor type brushless direct current motor of Kaizuka, U.S. Pat. No. 6,570,288 which teaches a fixed stator surrounded by a rotating outer rotor, a rotating shaft of the outer rotor surrounded by the stator. The magnets secure along an inner circumference of an annular yoke such that the magnetic poles face the S magnetic poles.

Finally, US 2009/0295531, to Silva, teaches a conductive cable for reducing the power losses in components, such as inductors and transformers. The conductive cable includes multiple strands that each include an inner conductor and an outer insulating layer. The conductive cable includes strands of multiple cross-sectional areas (multiple gauges), such that the power losses associated with the skin effect may be reduced. The cross-sectional areas of the strands of the conductive cable may be selected dependent upon the frequency content of the current that they are intended to carry. In the case of a PFC boost converter, the various cross-sectional areas of the strands may be selected to carry the harmonics of and AC power source, as well as higher frequency current caused by a switch associated with the PFC boost converter.

SUMMARY OF THE INVENTION

The present invention, while drawing from much the existing theory and teachings surrounding electrical motor and generator type conversion assemblies, in particular teaches an AC induction motor assembly for converting an electrical input to a mechanical or rotating work output. A related generator variant converts a rotating work input to a converted electrical output utilizing the same efficiencies achieved by the present design.

An outer rotatable component incorporates a plurality of magnets arranged in a circumferentially extending and inwardly facing fashion according to a first perimeter array, the outer component further incorporating a rotating shaft projecting from a central location. An inner concentrically arrayed and stationary component exhibits a plurality of coil sub-assemblies, each including a multi-wire and multiple winding braided configuration.

The coil sub-assemblies are supported in an exteriorly facing fashion upon the inner stationary component according to a second perimeter array, such that a determined gap separates coil sub-assemblies from the inwardly facing magnets. In this manner, and in a first motor variant, a three phase or other offsetting current profile is typically introduced to selected perimeter arrayed coils for influencing rotational driving of the outer rotatable and inwardly facing magnet array, thus causing efficient rotation of the central projecting shaft relative to the fixed interior (generally disk or annular shaped and upper surface mounted) inner component exhibiting the outer annular array of coil sub-assemblies. In a further generator mode, the rotation of the outer magnetic array and shaft causes an output current to be delivered from the windings associated with the inner stationary supported array of coils.

Each of the coil subassemblies further include a plurality of coils or windings, such as a copper or other highly conductive material which can be supported upon an insulating base or mounting portion of the inner/annular component and which can be consecutively wound or otherwise wrapped in any desired fashion. In one non-limiting example, a braided cross section of the windings can exhibit a plurality of three wires of consistent gauge. A related variant teaches a larger gauge (thicker) wire braided by a pair of smaller gauge (thinner) wires.

Additional non-limiting variants of coil windings teaches varying braided and winding profiles associated with the coil subassemblies, these utilizing any arrangement of larger and smaller wires, either in multiple wound/braided or end to end soldered fashion. In one non-limiting example, a plurality of five wires are braided in a consistent gauge or as a single larger gauge wire around which are braided any plurality of smaller gauge wires. Other patterns including soldering multiple thinner (smaller dimension) wires to a single thicker (larger dimension) wire. A further variant includes providing a dual wire coil winding in which current flows in opposite directions within each winding pair.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As previously described, the present invention relates generally to electrical generators and motors and, more specifically, discloses a brushless or other style AC induction motor or generator for converting either of an electrical input to a rotating work output (motor mode) or a rotating work input applied to a shaft (generator mode) resulting in an electrical output. More specifically, the present invention discloses an electrical induction generator or motor exhibiting reconfigured stator and rotor components for optimizing either electrical output (generator) of the rotating input applied to the rotor shaft or, alternately, a rotating work output of the rotating shaft (motor) resulting from an electrical (current) input, such as often occurring in a three phase format following energizing of both of opposing outer/inwardly facing magnet and inner/outwardly facing coil supporting perimeter arrays.

In combination with the above background description, the present invention discloses an improved arrangement of induction style AC generators or electric motors, in which an outer coaxial and inner facing circumferential array of magnets is incorporated into a redesigned rotor, which is opposed by an inner coaxially positioned, fixed and outwardly facing circumferential array of multi-wire wound/braided coil subassemblies, these further respectively incorporated into a redesigned stator. The redesigned aspects of the stator and rotor, in combination with the unique and novel aspects of the individually winding/braiding patterns of the multi-wire coil subassemblies, results in either improved electrical output of resulting from the configuration of the coils passing by the magnets to create an electrical charge or, in the alternate electrical motor variant, provides for an optimal work output of the rotor shaft in response to a given electrical input necessary for generating the opposing magnetic fields in the motor components. The variants depicted of the present invention further focus only on reconfigured rotor and stator components, as they relate to an electric motor or generator assembly, the understanding being that the use of commutators with slip ring segments and connecting brushes, as referenced in the above Background of the Art teachings, can be integrated into additional variants associated with the present design.

Figure 4:
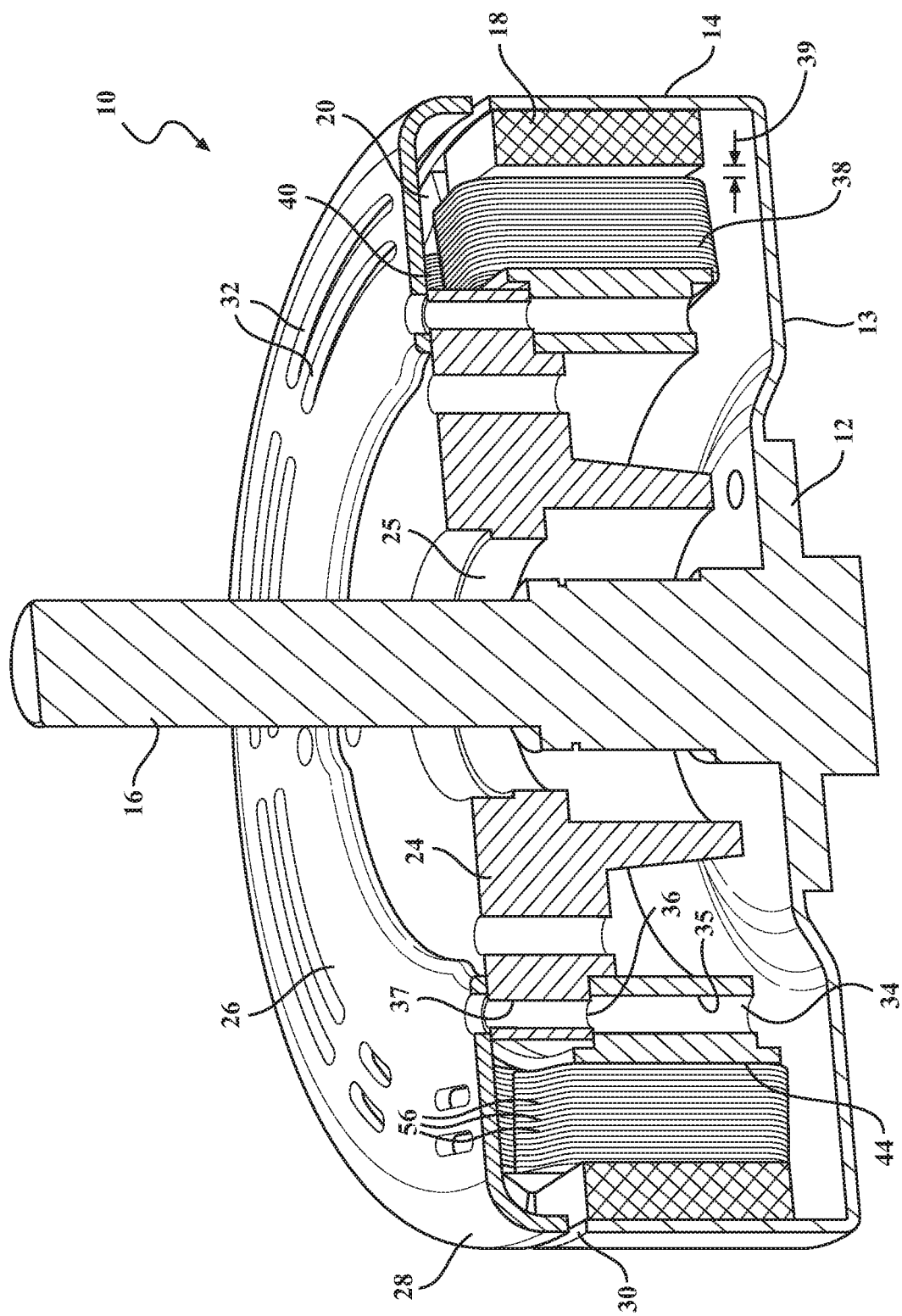
FIG. 4 is an assembly cutaway of the electric induction motor or generator according to the present inventions.

With reference to FIG. 4, an AC induction electric generator or motor is generally shown at 10 in cutaway fashion. A rotor component is exhibited by a circular shaped base, including a central reinforced portion 12 and a thinner cross sectional outer annular extending portion 13, with an annular outer and upwardly extending end wall 14. A rotatable shaft 16 extends upwardly from a center location of the base associated with the central reinforced portion 12 and, in operation, interfaces with any type of work input/output component not limited to a gear associated with either a mechanical output or other electrical generator input, and such as is associated with a generator.

Figure 1:
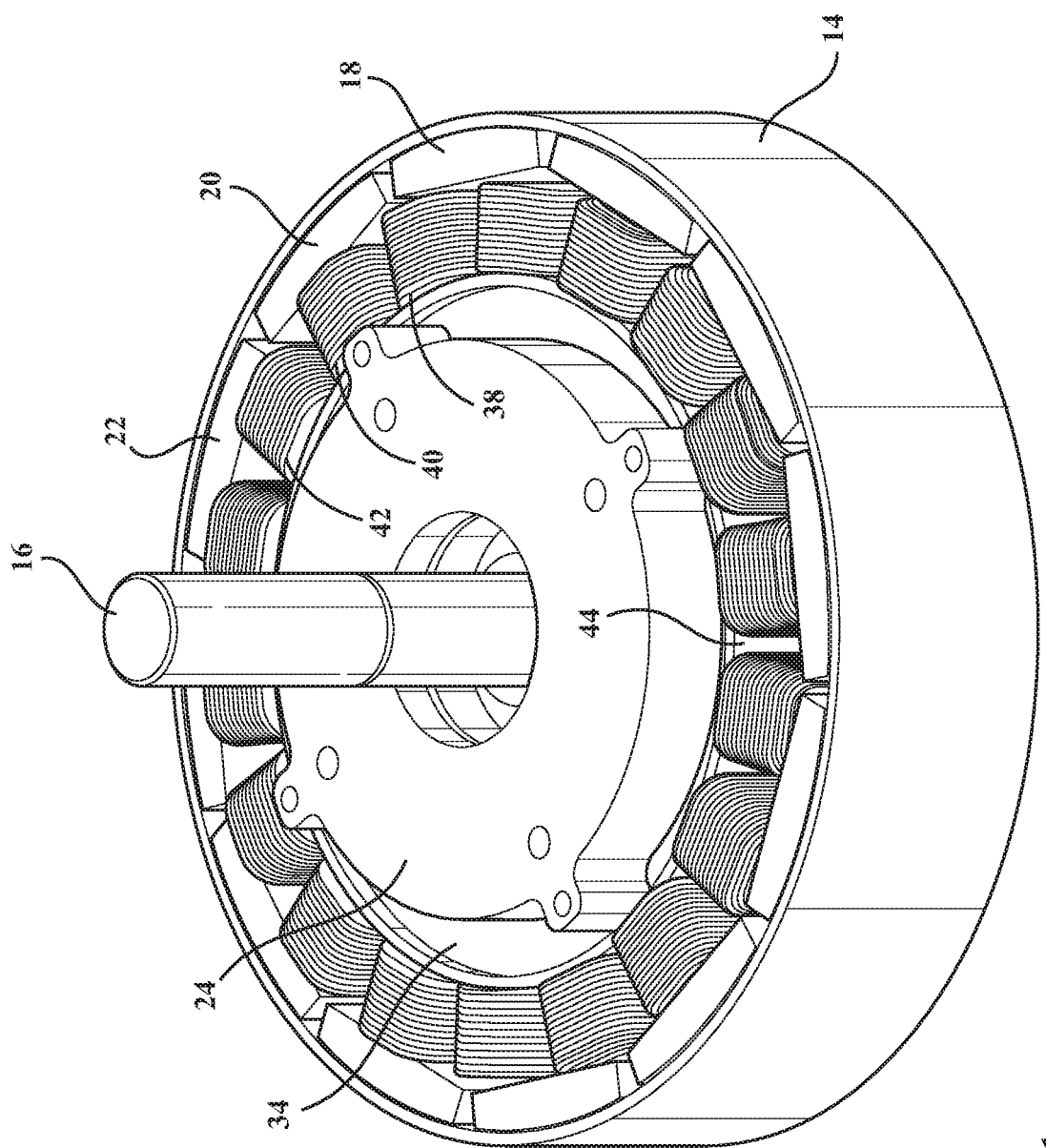
FIG. 1 is a perspective of the electrical generator or motor with the upper housing removed according to a non-limiting embodiment of the invention and which exhibits a plurality of circumferentially arranged and inwardly facing magnets associated with a shaft supporting and outer rotating component, in combination with an inner concentrically arrayed fixed and opposing component, upon which are supported the plurality of outwardly facing and individual coil sub-assemblies, the outer/inwardly facing magnets and inner/outwardly facing coil-subassemblies defining first and second perimeter extending arrays.

A plurality of magnets 18, 20, 22, et. seq. (see also FIGS. 1-2) are arranged in circumferential and inwardly facing fashion about the inner annular surface of the outer end wall 14 and according to a first perimeter array. Aside from the three dimensional and pseudo-rectangular shape depicted in the illustrations, it is further understood that the magnets can be configured in any other shape or profile and can be provided with any variable of magnetic force configuration.

Consistent further with the previous overview of electrical magnetic motors and generators and, in an electrical motor application, a suitable armature current or the like is provided to the magnets, such as by fixed brushes and rotating commutators, and in order to generate the desired magnetic field in the rotor component (motor mode). Although not shown in FIG. 4, these components are typically integrated into the housing and include stationary armature brushes mounted atop the (central) stator, with commutators supported in electrically communicating fashion while mounted to the rotor. Within limitation, the present invention also envisions any other electrical current delivery structure for energizing the magnet perimeter array in any of a continuous/steady or alternating/phased manner.

Referencing again FIG. 4, a redesign of the stator (stationary) component includes an interior supported and generally annular (disk or ring) shaped structure 24 which includes an inner annular aperture defining and closed inner perimeter surface 25, within which the rotor shaft 16 projects from the lower rotatable component 12 of the motor housing. The inner stationary component further includes an outer annular extending top portion 26 which terminates in a downwardly curved outer edge 28 arranged in close and upwardly spaced proximity to an upper edge 30 associated with annular end wall 14 of the rotor. Also shown are heat dissipation slots (see inner perimeter edge defining walls 32) formed in the top 26 along with any other configuration of tab, slot or bracket to facilitate mounting of the inner disk shaped component 24 at locations along its top portion (portions 24, 26 and 28 are understood to be stationary relative to 12 and 14 of the outer magnet supporting component which rotates).

Figure 2:
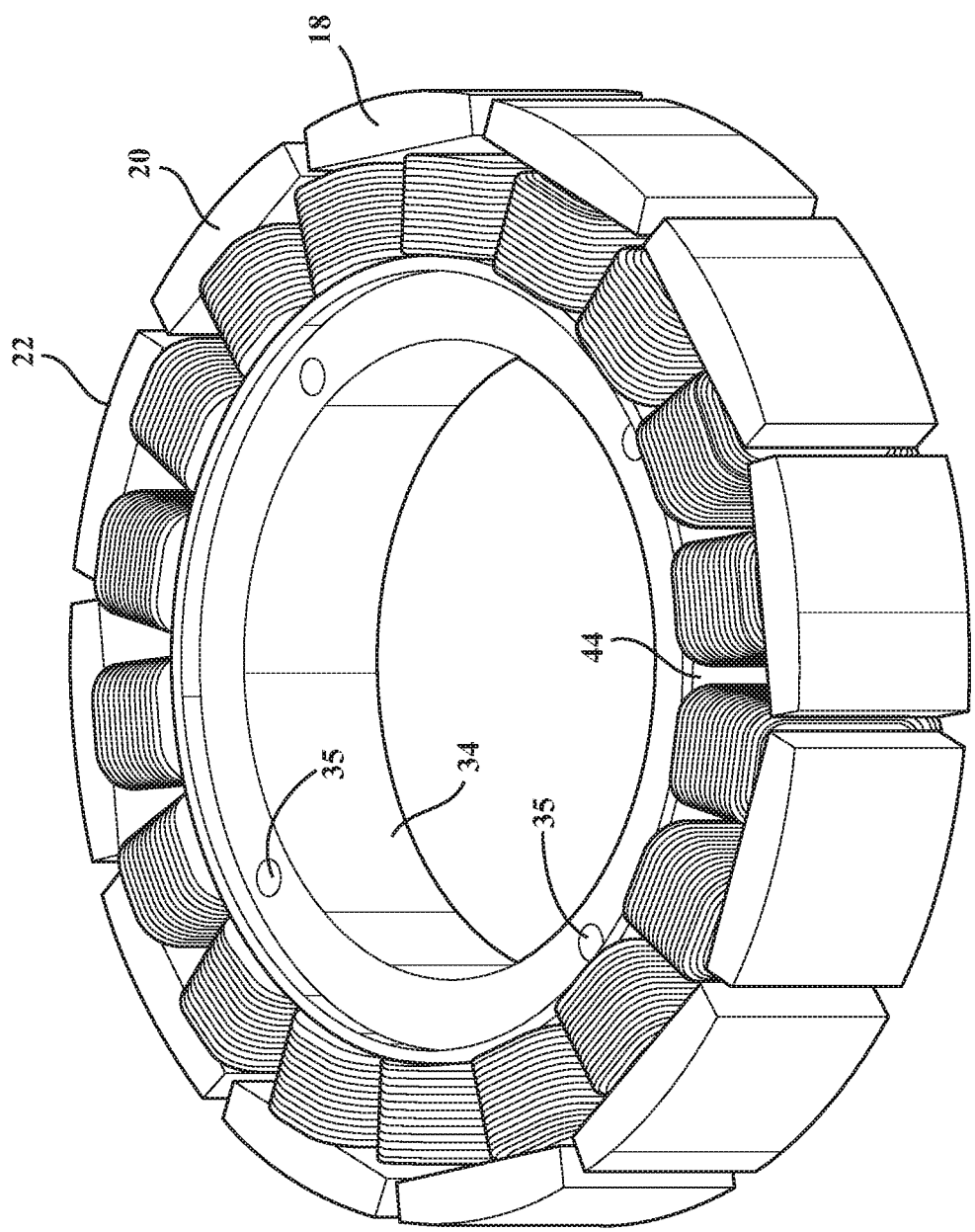
FIG. 2 is a partial perspective of selected portions of the inner coil sub-assembly supporting and stationary annular or disk shaped component, again showing the outer/inwardly facing magnet array incorporated into the outer rotating component, and better illustrating the arrangement and configuration of the components for facilitating rotation of the central extending shaft of FIG. 1.
Figure 3:
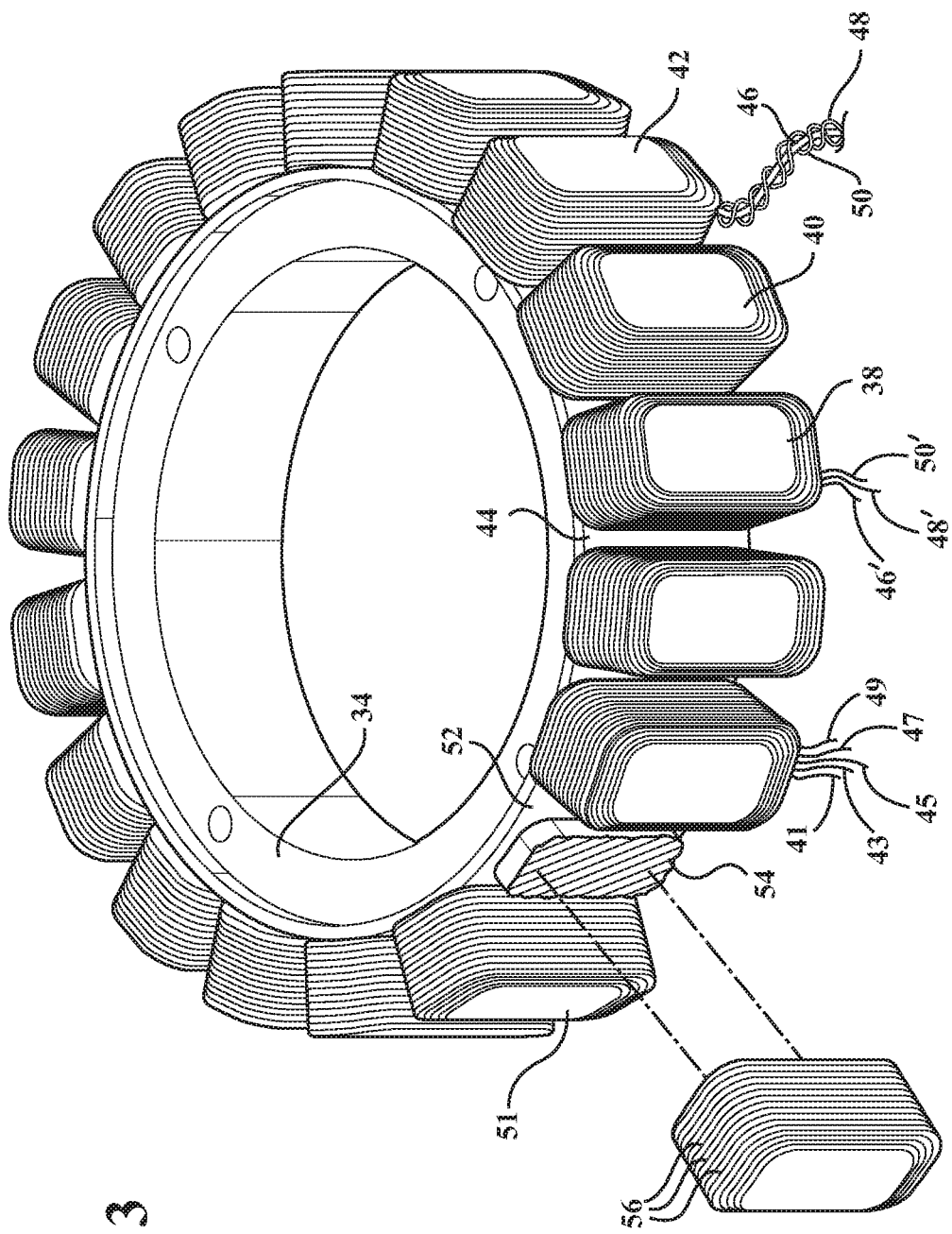
FIG. 3 is a similar illustration to FIG. 2 and further depicting the removal of the outer circumferential array of magnets, along with exhibiting variations in coil geometry and braiding patterns associated with the inn concentrically arranged and opposing array of coil sub-assemblies depicted in partially exploded or extending fashion.

Referencing FIG. 4 again in combination with FIG. 3, a further integrated portion of the redesigned stator includes an annular ring 34, which is mounted to an outermost radial and underside facing location, see at 36 in FIG. 4, of the annular shaped stator interior structure associated with the disk shaped component 24, this further referenced in FIG. 2 by bolt fastener defining apertures 35 in the annular ring 34 which facilitate in one arrangement mounting to underside communicating aperture 37 (see FIG. 4) associated with the inner disk shaped component 24. The material construction of the various stator and rotor components can include any metallic or other material, such as which can further include any suitable insulating components for ensuring localization of generated magnetic fields in the desired and intended fashion (e.g. commutator, armature brushes, etc.). In this fashion, the outer/rotatable annular component further constitutes a lower component (see as shown in cutaway in FIG. 4) with the inner/stationary and affixed component further constituting an upper component.

As best shown in FIG. 3, a plurality of individual coil subassemblies are provided at 38, 40, 42 et seq. and which are mounted to an outer facing annular surface 44 of the interior supported annular ring 34 in the manner shown and according to a second outwardly facing perimeter array. The coil subassemblies are depicted in generally representative fashion and are arranged such that they facing outwardly and oppose the inwardly facing circumferential array of magnets 18, 20, 22, et seq. with a desired air gap existing therebetween (see at 39 in FIG. 4).

As best represented in FIG. 3, each of the coil subassemblies includes a non-limiting braided or wound pattern of multiple wires, such including a first representation of a larger diameter (or gauge) wire 46 with a pair of smaller gauge wires 48 and 50 wound or braided around the larger wire. A further example of a selected coil subassembly also depicts a three wire plurality 46', 48' and 50' of consistent gauge/size which can be wound or braided according to any cross section.

Figure 3B:
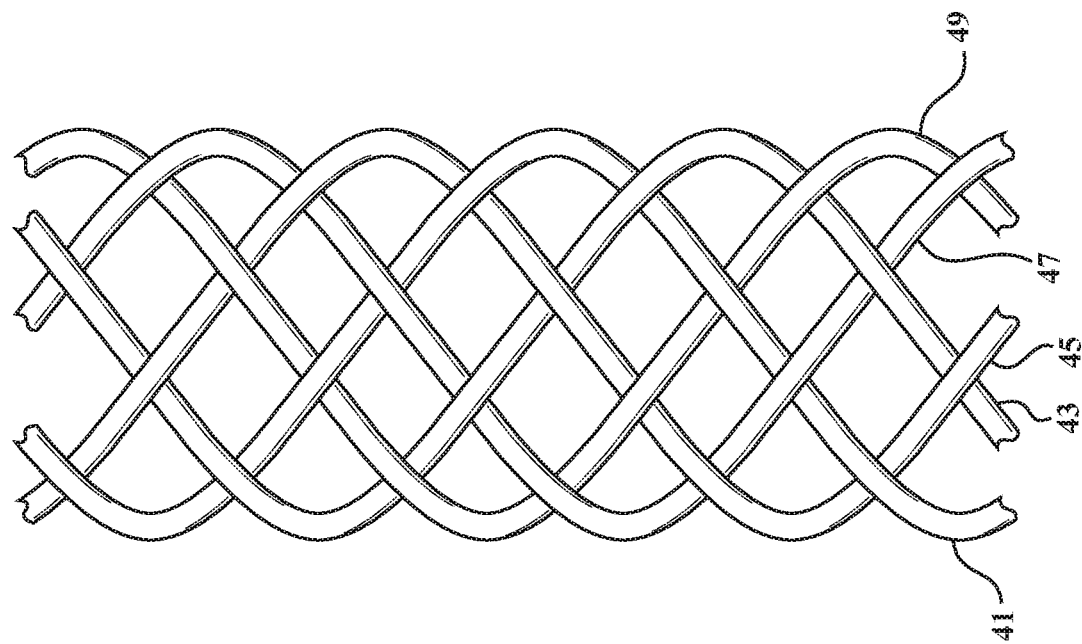
FIG. 3B depicts five wires in a braided pattern according to one or more embodiments shown and described herein.
Figure 3A:
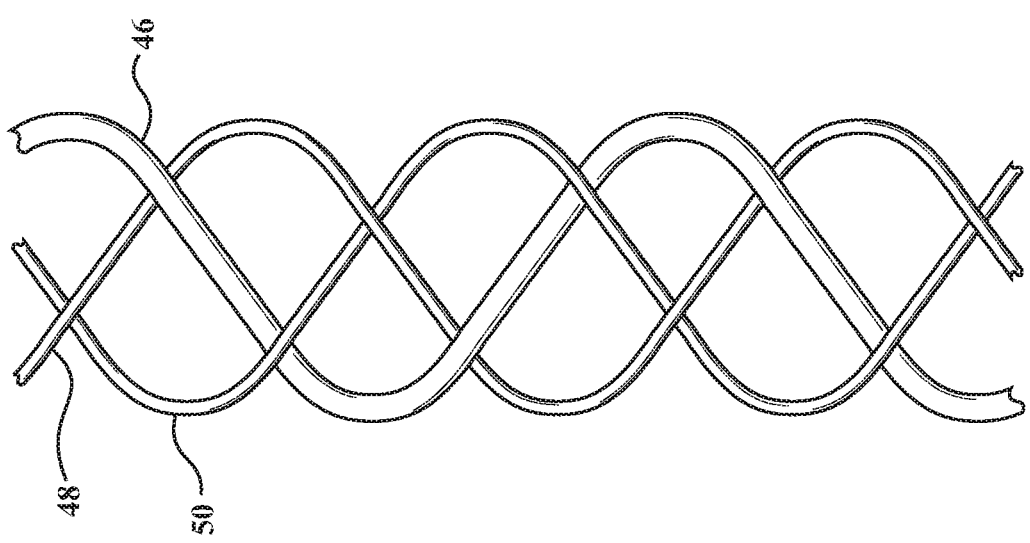
FIG. 3A depicts three wires in a braided pattern according to one or more embodiments shown and described herein.

As further shown in FIGS. 3A and 3B non-limiting examples of multiple wires in a braided pattern or configuration as disclosed herein. More specifically, FIG. 3A depicts an example representation of a larger diameter wire 46 with a pair of smaller gauge wires 48 and 50 braided around the larger wire 46, as described above. FIG. 3B depicts an example representation of a five wire arrangement (wires 41, 43, 45, 47, and 49) which can include similar or varying gauge/thicknesses, as described hereinafter.

Beyond the three wire braided patterns shown, it is further envisioned and understood that other suitable patterns can be generated by any plurality of wires, having equal or unequal diameters or gauges according to any combination, and which can be wound, braided or otherwise intertwined in any fashion desired in order to provide the appearance of a single wire. This is further shown by non-limiting example with a five wire arrangement (see trailing wires 41, 43, 45, 47 and 49) which can include similar or varying gauges/thicknesses.

In one non-limiting application, a multi-phase current can be delivered to selected individual coil sub-assemblies (such as through communicating or extending locations depicted by the individual wires shown in FIG. 3). The phased current delivery around the inner/outwardly facing coil subassemblies then can act upon the magnetic fields associated with the outer and inwardly facing rotating magnet array in order to optimally drive the outer magnet array and the central shaft.

Without limitation, other pluralities of wires can be incorporated into varied winding patterns, such as which are depicted wound about the main supporting body (see for example at 51 in FIG. 3) associated with each of the coil supporting sub-assemblies. As further depicted in FIG. 4, each coil subassembly can include an insulated platform 52 which includes a winding supporting superstructure, such as further referenced by cutaway portion 54 which can form a portion of a coil supporting body (e.g. again at 51), or which can constitute a base mounting portion to which the individual coil subassembly bodies can be affixed.

As further understood, the varying multiple wire braids contemplate them being wound or otherwise configured and as shown by non-limiting example by the multi-wire profile (see at shown by multiple windings 56, each which are again understood to incorporate any plurality of elongated wires braided according to a desired pattern).

Figure 5:
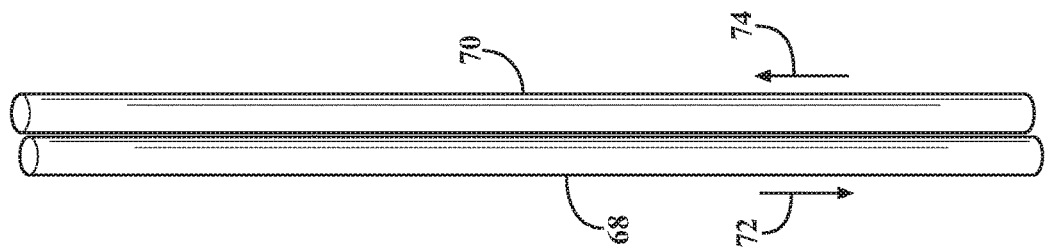
FIG. 5 is an illustration of a wire coil winding arrangement similar to that depicted in FIG. 3A according to the present invention.
Figure 7:
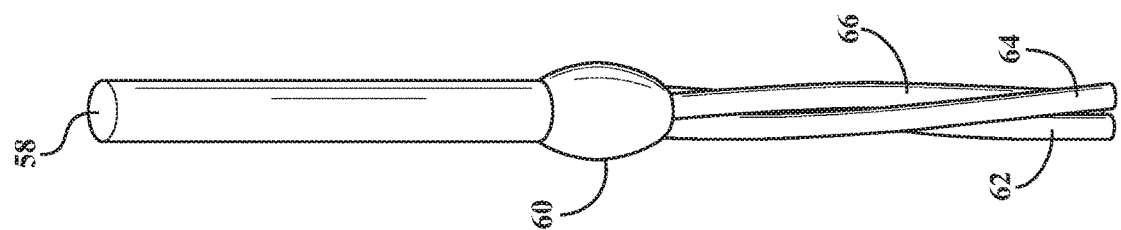
FIG. 7 is an arrangement similar to FIG. 3B of a multiple five wire braiding pattern.

Proceeding now to FIG. 5, an illustration is shown at the wire coil winding arrangement similar to that depicted in FIG. 3A according to the present invention, and which illustrates a larger diameter central wire 46, about which is braided a pair of smaller outer diameter wires 48/50. FIG. 7, similarly depicts an arrangement similar to FIG. 3B in which a multiple five wire braided pattern is illustrated by wires 41, 43, 45, 47 and 49.

Figure 8:
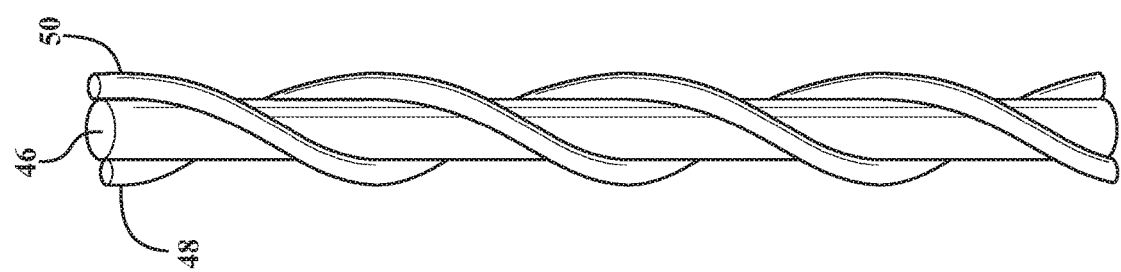
FIG. 8 is a further arrangement of a two wire coil winding pattern in which current flows occur in opposite directions.

FIG. 7 is an illustration of a further wire coil winding arrangement, in which a single larger diameter wire 58 is soldered, at 60, to any plurality of thinner/smaller diameter wires, shown at 62, 64, and 66 the smaller diameter wires optionally being braided together. FIG. 8 is a further arrangement of a two wire coil winding pattern, see at 68 and 70, in which current flow through the wires occurs in opposite directions (see directional indicators 72 and 74).

Figure 11:
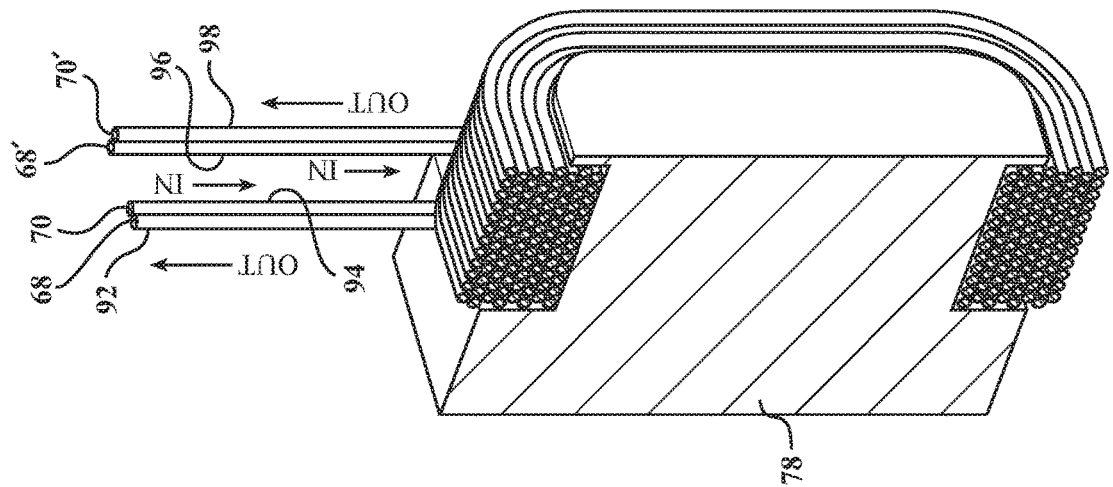
FIG. 11 is a cutaway of a selected coil winding subassembly utilizing the winding pattern of FIG. 8.
Figure 10:
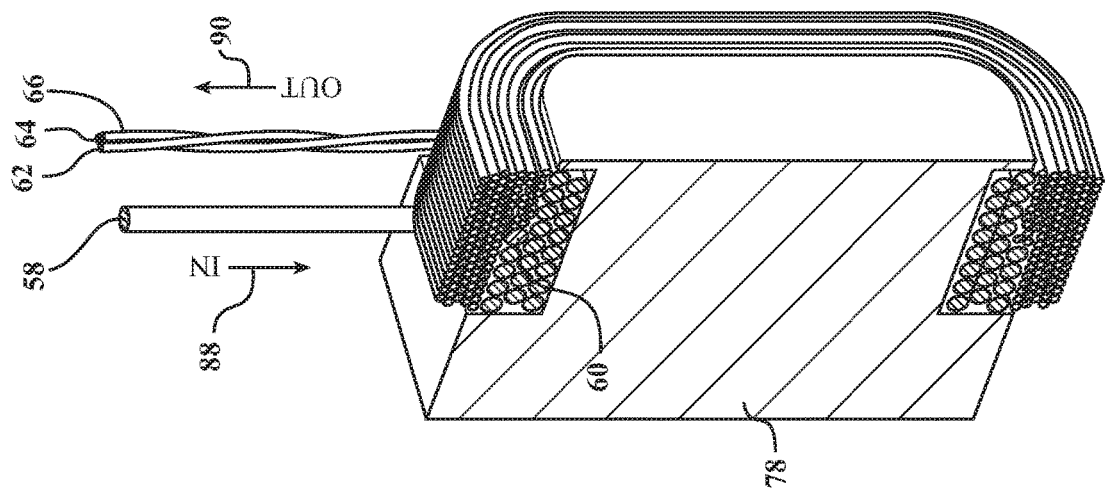
FIG. 10 is a cutaway of a selected coil winding subassembly utilizing the winding pattern of FIG. 6.
Figure 9:
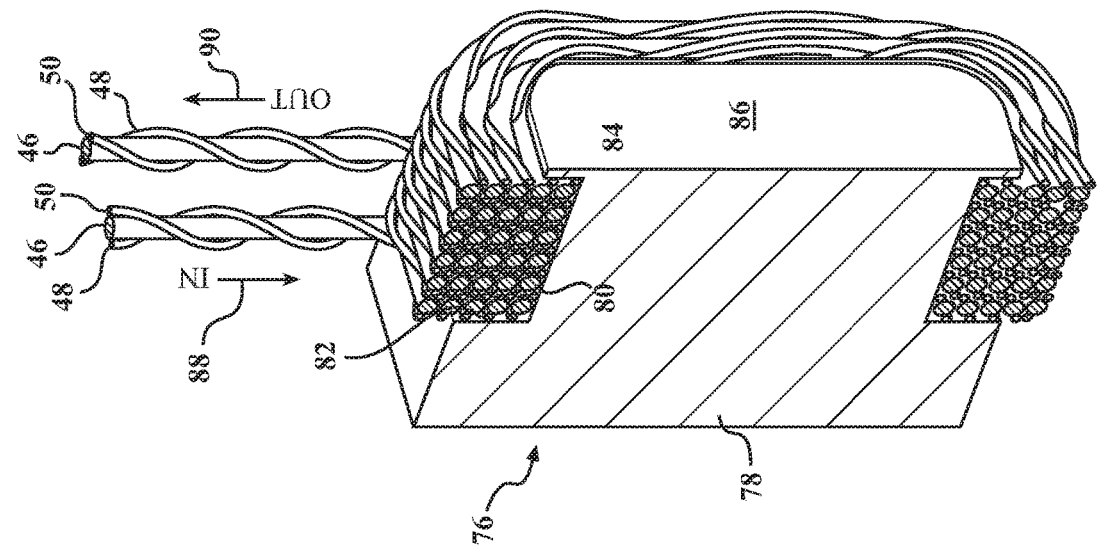
FIG. 9 is a cutaway of a selected coil winding subassembly utilizing the winding pattern of FIG. 5.

Finally, FIGS. 9-11 depicted a series of cutaway illustrations of alternate winding patterns in use with coil subassemblies (compare to as shown in FIG. 3) for providing enhanced power output. Prior to a detailed discussion of the variants, some background explanation of the theory behind electromagnetic filed inducing coil windings in relation to the advantages of the proposed winding designs is provided as follows.

By definition, the wire or conductor which constitutes the coil is called the winding. Each loop of wire within the winding is further referred to as a turn. As is further understood, and in windings in which the turns touch, the wire must be insulated with a coating nonconductive insulation such as plastic or enamel to prevent the current from passing between the wire turns. This is understood to apply to each of the variants of windings depicted herein.

Increases in strength of the coil magnetic, field generated is typically accomplished by any one or more of wrapping the coil around an iron core, adding more turns to the coil and/or by increasing the current flowing through the coil. The amount of magnetic field generated by the wire can be calculated based upon the length of wire and current. In technical terms, every coil of wire increases the "magnetic flux density" strength) of the magnet. The magnetic field on the outside of the coil resembles a bar magnet. As is further known, flow of direct current through the wire and from one side of the coil to the other passing through the hole results in the generation of the magnetic field. The hole in the center of the coil is called the core area or magnetic axis. Similar to a permanent magnet, iron inside the results in coil the magnetic field is stronger.

By design, the efficient arrangement of the coil windings ideally achieves the objectives of minimizing use of materials and volume required for a given purpose. The ratio of the area of electrical conductors, to the provided winding space is referenced as "fill factor" and, since round wires will always have some gap and the wires will also have some space required for insulation between turns and between layers, the fill factor is always smaller than one. Although note shown, and to achieve higher fill factors, rectangular or flat wire can be used.

As previously described, an electromagnetic coil is an electrical conductor such as a wire in the shape of any of a coil, spiral or helix. Electromagnetic coils are used in electrical engineering, in applications where electric currents interact with magnetic fields, in devices such as electric motors, generators, inductors, electromagnets, transformers, and sensor coils. Either an electric current is passed through the wire of the coil to generate a magnetic field, or conversely an external time-varying magnetic field through the interior of the coil generates an EMF (voltage) in the conductor.

As is further known in the relevant art, current through any conductor creates a circular magnetic field around the conductor due to Ampere's law. The advantage of using the coil shape is that it increases the strength of magnetic field produced by a given current. The magnetic fields generated by the separate turns of wire all pass through the center of the coil and add (superpose) to produce a strong field there and so that, the more turns of wire provided, the stronger the field produced. Conversely, a changing external magnetic flux induces a voltage in a conductor such as a wire, due to Faraday's law of induction. The induced voltage can be increased by winding the wire into a coil, because the field lines intersect the circuit multiple times.

The winding is often wrapped around a coil form made of plastic or other material hold it in place. The ends of the wire are brought out and attached an external circuit Windings may have additional electrical connections along their length, referred to as taps. A winding which has a single tap in the center of its length is called center-tapped. As is further known, coils can have more than one winding, insulated electrically from each other. When there are two or more windings around a common magnetic axis, the windings are said to be inductively coupled or magnetically coupled.

Applying the above theory and teachings, FIG. 9 is a cutaway, generally at 76, of a selected coil winding subassembly, such as which can include a core 78 of iron or other suitable material and which supports the winding pattern of FIG. 5. As disclosed, the insulated coil (again depicted by central larger diameter wire 46 and helically wound smaller diameter wires 48/50) are wound in multiple turns about a notched exterior facing perimeter (also defined as an outer perimeter pocket in the core as exhibited by recessed base perimeter surface 80 and opposing side edge surfaces 82/84 which are located proximate a forward most end face 86 of the core 78). The core can further include an insulated base or other surfacing in order to properly regulate and direct the electromagnetic fields generated in cooperation with the copper windings.

The coil in FIG. 9 is again depicted with multiple windings and so that, current flow from an inlet direction at 88 to outlet direction at 90, results in an enhanced generation of the coil magnetic field which, upon interfacing with the outer rotating magnetic ring array 14 (again supporting magnets 18, 20 and 22), rotation of the outer ring array again driving the output shaft 16 via its reinforced central location.

Figure 6:
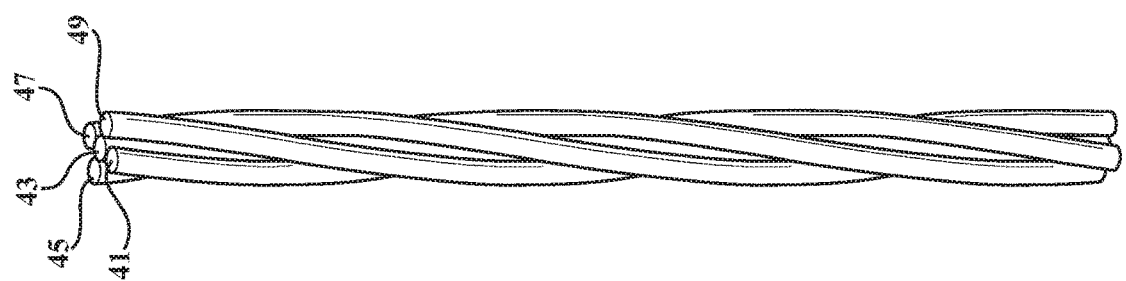
FIG. 6 is an illustration of a further wire coil winding arrangement in which a single larger diameter wire is soldered to one or more thinner/smaller diameter wires, the smaller diameter wires optionally being braided.

FIG. 10 is a cutaway of a selected coil winding subassembly utilizing the winding pattern of FIG. 6. In this variant, the thicker wire 58 (see inlet direction 88) is initially wound a determined number of times (windings) within the forward edge proximate recess pocket of the subassembly core 78 (see again as referenced in FIG. 9). At an intermediate location (which can represent any overall percentage of the total number of windings not limited by example between 10%-90% of the depth capacity of the outer perimeter facing pocket), the soldered location 60 is reached, following which the subsequent exterior layers of windings are of the braided otherwise, inter-helically wound pattern of wires 62/64/66 up the outermost winding layers as again reflected by outlet location 90.

As described, the relative percentage of the total windings represented by the larger diameter wire 58 and end extending wires 62/64/66 can vary between 10%-90% of the total winding capacity of the core outer perimeter pocket, with the current passed through the multiple windings providing a magnification of electromagnetic fields generated by the outermost sub-plurality of windings associated with the soldered branch of the smaller wires 62/64/66.

Finally, FIG. 11 is a cutaway of a selected coil winding subassembly utilizing the winding pattern of FIG. 8, and again in which the two wires associated with each individual coil winding include separate current directional flows. These include outlet directed current 92 and inlet directed current 94 for first combined winding 68/70, and further inlet directed current 96 and outlet directed current 98 for second combined winding 68'/70'. The multiple and cross (or counter directed) current profiles are submitted to increase the electromagnetic fields generated with the core 78, with resultant increase in the driving/rotating forces exerted between the coil arrays and the outer magnet ring array 14, such as in a three phase or other inducing fashion in order to maximize rotational driving force and efficiency of the output shaft 16.

Beyond the variants illustrated, the present invention contemplates winding the multi-wire cross sectional configurations (again of any non-limiting number or braiding pattern) about the individual and circumferentially spaced and outwardly facing support platforms (see also at 51 in FIG. 3) according to any directional pattern (horizontal, vertical, and combinations thereof). The braiding pattern, number of windings and direction associated with each of the coil sub-assemblies are further understood to contribute to the creation of a desired magnetic field produced profile, consistent with the afore descriptions, in the reconfigured stator component and which, in combination with the fixed or variable fields generated in combination with the outer concentrically arranged magnets, contributes to increased driving rotation of the outer annular rotor component portions 12, 13 and 14 along with shaft 16) in a maximum efficient manner.

The individual wiring arrangements thus created are engineered to maximize the generation and application of magnetic fields in selected stator supported coil subassemblies, these interfacing with the opposing magnetic field profile generated by the magnetic elements 18, 20, 22 et seq. in order to generate the driving forces explained in the previous analysis and in order to maximize the driving efficiency of the outer annular supported rotor (magnet array) component relative to the inner stationary supporting stator component (again FIG. 4) in an electric motor application. In the alternate generator application, the efficiencies released by the braiding of the multiple wire armature coil subassemblies results in both enhanced electromagnetic induction generated (EMF) forces resulting from the reversing fields created by the work induced rotation of the outer magnet array as translated into superior collection of the electrical charge created by the interaction of the rotating outer magnets and the inner stationary coil subassemblies. Without limitation, the novel aspects of the magnetic generator or motor configurations depicted herein include but are not limited to the individual coil winding patterns (such as again which can include any plurality of individually braided wires of similar or varying gauge not limited to examples of the three, five or other pluralities of inter-braided wiring patterns).

The concentric arrangement of the inner stator and outer rotor is further understood to contribute, along with the coil winding geometries, to the efficiency of the AC magnetic induction motor or generator arrangements such as which is shown however it is further understood and envisioned that other reconfigurations of the rotor and stator can retain the individual wire braid patterns depicted upon the stator and which will retain or enhance the efficiency of the design.

Having described my invention, other and additional preferred embodiments will become apparent to those skilled in the art to which it pertains, and without deviating from the scope of the appended claims.

I claim:

1. An electrical energy conversion system, comprising:
   an outer rotatable component incorporating a plurality of magnets arranged in a circumferentially extending and inwardly facing first perimeter array with respect to a rotating shaft structurally coupled and projecting from a central location of the outer rotatable component;
   an inner concentrically arrayed component incorporating a plurality of coil sub-assemblies, each coil subassembly including a core having an outer peripheral extending pocket against which is wound a wire with an inlet end and an outlet end, each of said coil sub-assemblies supported in an exteriorly facing fashion according to a second perimeter array, such that a gap separates said coil sub-assemblies from said inwardly facing magnets;
   said wire further including a conductive material supported upon an insulating base associated with said pocket of each of said cores, and so that said a plurality of windings of said wire surround said insulating base;
   said wire further including a single larger gauge wire and a plurality of smaller gauge wires soldered to an extending end of said larger gauge wire so that said larger wire defines said inlet end with an initial sub-plurality of said plurality of windings against said core and said smaller gauge plurality of wires define an outlet end with a successive sub-plurality of said plurality of windings applied over said initial sub-plurality; and in a first application, a current supplied to at least said inner component creates opposing magnetic fields in a phased/shifting manner with said outer rotatable component resulting in rotational motion of said shaft; and in a second application, an external rotating work input supplied to said shaft creates opposing magnetic fields between said outer rotatable component and said inner component resulting in an electrical current output delivered from the inner component.

2. The invention as described in claim 1, said outer rotatable component further comprising a lower housing and the inner component an upper housing, said shaft associated with said outer component extending through a central through aperture associated with said inner component.

3. An electric motor, comprising:

an outer rotatable component incorporating a plurality of magnets arranged in a circumferentially extending and inwardly facing first perimeter array with respect to a rotating shaft structurally coupled and projecting from a central location of the outer rotatable component;

an inner concentrically arrayed component incorporating a plurality of coil sub-assemblies, each coil subassembly including a core having an insulated and outer peripheral extending pocket against which is wound a wire of a conductive material, the wire having an inlet end and an outlet end, each of said coil sub-assemblies supported in an exteriorly facing fashion according to a second perimeter array, such that a gap separates said coil sub-assemblies from said inwardly facing magnets;

said wire further including a single larger gauge wire and a plurality of smaller gauge wires soldered to an extending end of said larger gauge wire so that said larger wire defines said inlet end with an initial sub-plurality of said plurality of windings against said core and said smaller gauge plurality of wires define an outlet end with a successive sub-plurality of said plurality of windings applied over said initial sub-plurality; and a current supplied to at least said inner component creates opposing magnetic fields in a phased/shifting manner with said outer rotatable component resulting in rotational motion of said shaft.

4. An electric generator, comprising:

an outer rotatable component incorporating a plurality of magnets arranged in a circumferentially extending and inwardly facing first perimeter array with respect to a rotating shaft structurally coupled and projecting from a central location of the outer rotatable component;

an inner concentrically arrayed component incorporating a plurality of coil sub-assemblies, each coil subassembly including a core having an insulated and outer peripheral extending pocket against which is wound a wire of a conductive material, the wire having an inlet end and an outlet end, each of said coil sub-assemblies supported in an exteriorly facing fashion according to a second perimeter array, such that a gap separates said coil sub-assemblies from said inwardly facing magnets;

said wire further including a single larger gauge wire and a plurality of smaller gauge wires soldered to an extending end of said larger gauge wire so that said larger wire defines said inlet end with an initial sub-plurality of said plurality of windings against said core and said smaller gauge plurality of wires define an outlet end with a successive sub-plurality of said plurality of windings applied over said initial sub-plurality; and an external rotating work input supplied to said shaft creates opposing magnetic fields between said outer rotatable component and said inner component resulting in an electrical current output delivered from the inner component.

\* \* \* \* \*